Jan. 1, 1974  J. R. NORMANTON  3,783,074
METHOD OF BONDING USING STRINGS OF ADHESIVE
Original Filed Jan. 24, 1968  3 Sheets-Sheet 2
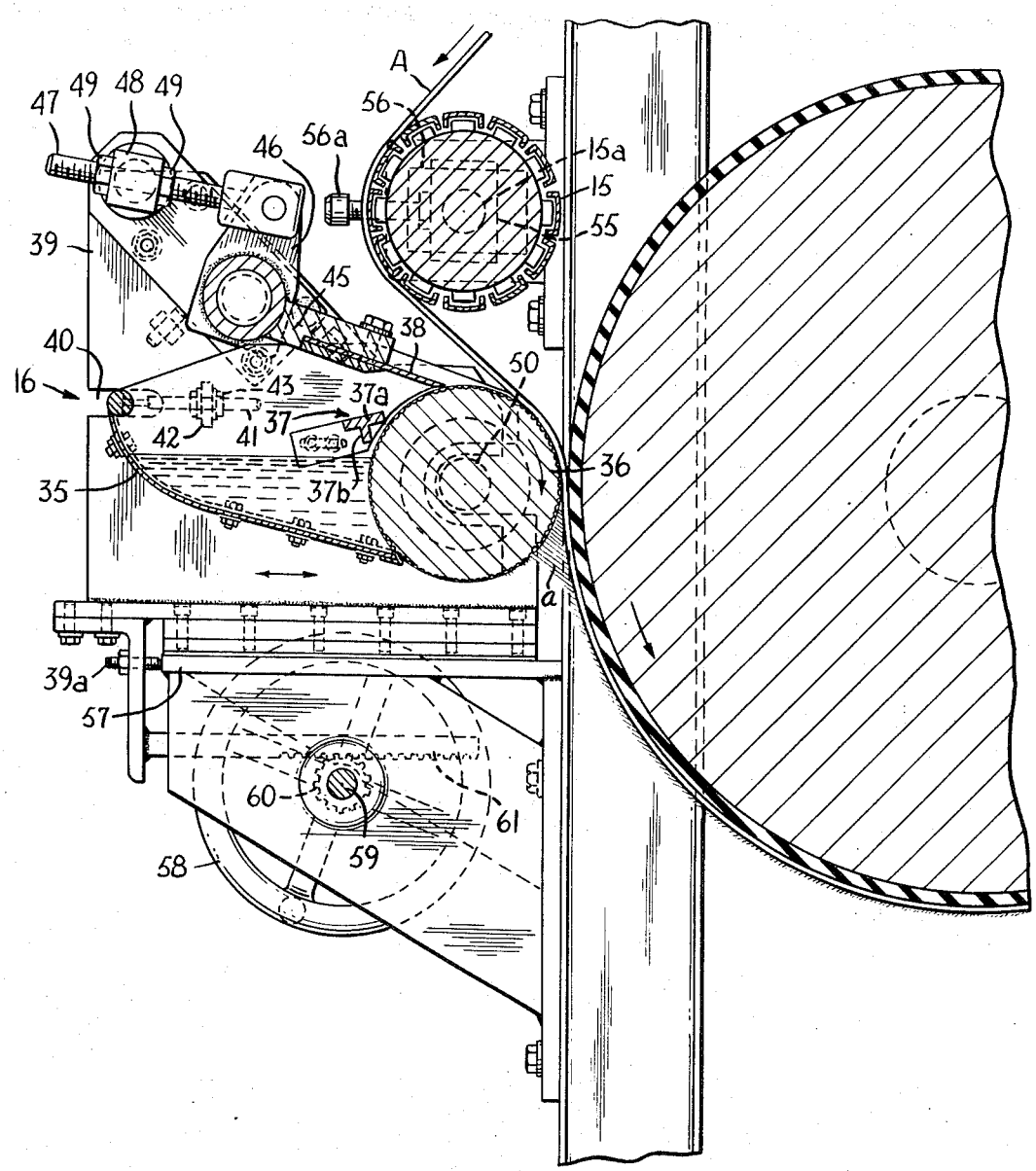
FIG. 2
FIG. 4
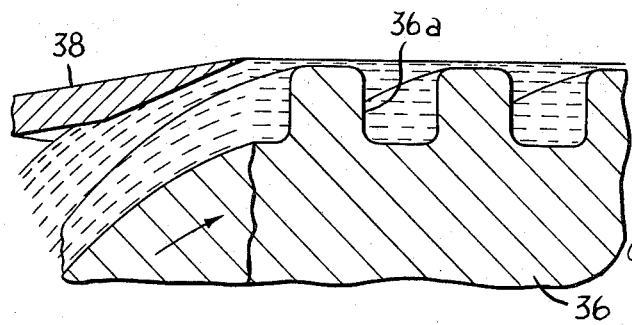
INVENTOR.
JOHN REGINALD NORMANTON
BY
his ATTORNEYS

United States Patent Office 3,783,074
Patented Jan. 1, 1974

3,783,074
METHOD OF BONDING USING STRINGS OF ADHESIVE
John Reginald Normanton, Hale, England, assignor to The Duplan Corporation, Winston-Salem, N.C.
Continuation of abandoned application Ser. No. 700,147, Jan. 24, 1968. This application Feb. 16, 1971, Ser. No. 115,821
Claims priority, application Great Britain, Nov. 2, 1967, 49,760/67
Int. Cl. B32b 5/00, 7/12; C09j 5/00
U.S. Cl. 156—291                                         5 Claims

ABSTRACT OF THE DISCLOSURE

A method of producing a laminated product, for example, a fabric, in which one web of a fabric in properly stretched and wrinkle-free condition is brought into engagement with an adhesive roll carrying a small metered amount of adhesive, a stringing effect is produced as the fabric leaves the surface of the adhesive roll, creating a definable adhesive structure on the fabric, the fabric is transferred to a rotating roll which maintains the fabric in properly stretched, wrinkle-free condition, leaving exposed a substantial area of the adhesive for removal of solvent and release of vapors, the web is brought into pressure contact with another fabric web to which it is to be laminated, and then the laminate is carried around and held against a drum for further removal of the solvent and to keep the fabric webs pressed together for a period of time after lamination.

---

This application is a continuation of Ser. No. 700,147, filed Jan. 24, 1968, now abandoned.

Described herein is an adhesive applying apparatus which includes a rotatable, helically engraved adhesive applying roll which picks up the adhesive from a trough on a moving web of fabric, a doctor blade which meters the adhesive carried on the engraved roll, a pre-metering bar in advance of the doctor blade for regulating and returning to the trough a considerable amount of excess adhesive, and means for adjusting the axis of the engraved roll and the direction of feed of the fabric toward the engraved roll to control the length of the arc of engagement of the fabric with the engraved roll.

Also described herein are a method and means for applying the adhesive to the fabric in which the engraved roll initially forms an underlay of adhesive on the fabric and then as the fabric moves out of engagement with the engraved roll produces a multiplicity of strings which tend to stretch, ultimately breaking and contracting against the surface of the fabric, resulting in an adhesive structure composed of a base print overlaid with a heterogeneous mass of tendrils ready for adhesive contact with the surface of the other fabric.

This invention relates to a novel laminated product and to a novel method and apparatus for producing the laminated product.

An object of the present invention is to provide a method and apparatus for producing a laminated fabric of satisfactory feel and handle which is permanently bonded to withstand washing and dry cleaning produced at variable speeds utilizing a minimum of adhesive.

Laminated fabrics have heretofore been made by techniques in which either excessively high temperatures or unsatisfactory methods of metering the adhesive have been employed.

In one method of producing laminated fabrics the adhesive has been applied directly to one fabric by a doctor knife or other means which cannot properly meter the adhesive on the fabric.

In another conventional method of producing laminated fabrics an intermediate layer of polyester foam is fed in web form and exposed on one side to the heat given off by a flame burner before being brought into contact with the first fabric, then the opposite side of the foam is exposed to the heat of a flame burner before that surface is brought into contact with the second fabric. Apart from the obvious disadvantages of using flame burners in the manufacture of laminated fabrics, the presence of the intermediate layer of foam makes for excessive use of adhesive, inability to regulate the speed of lamination, imparts bulk and decreases the draping characteristics of the laminated product.

In still another method of laminating fabrics using water based acrylic adhesives, high temperatures in the range of from 130 to 225° C. must be employed, thereby increasing the cost of the operation and rendering the process unsuitable for use with fabrics such as acrylic and polyester fabrics which will distort and be damaged at such high temperatures. Moreover, when the acrylic adhesive is spread evenly the resulting laminated fabric has firm and hard handle characteristics. In an effort to give such fabrics softer, more natural handling characteristics the adhesive has been printed on in spots, but this in turn reduces the effectiveness and permanence of the bond.

The present invention provides a laminated fabric having softer, more natural handling characteristics and a permanent bond produced by a process and apparatus in which the adhesive is metered sparingly regardless of speed of operation and which do not require subjecting the fabrics to high heating temperatures, thereby permitting use of a wider range of fabrics. The washing and dry cleaning limitations of the laminated fabric of the present invention depend on the fabrics themselves and not the bond between them.

In the method and apparatus of producing laminated fabrics according to the present invention, one of the fabrics, usually the face fabric if it is to be bonded to a lining fabric, and after insuring that it is wrinkle-free and stretched to the proper width, is brought into contact with a rotating adhesive-applying roll which applies an adhesive curable at low temperature to one surface of the fabric. The fabric is carried with the adhesive face exposed to permit removal of excess solvent and vapors before being brought into pressure contact with another fabric. The laminate is then brought into contact with a low temperature, preferably in the range of from room temperature to about 95° C., to evaporate the remaining solvents.

A feature of the present invention is the adhesive applying apparatus which includes an adhesive applying roll that picks up adhesive from a trough, a doctor blade which meters the adhesive carried by the roll to the fabric, pre-metering means in advance of the doctor blade which regulates the amount of adhesive carried by the roll to the doctor blade and at the same time provides an upper return surface for the flow of excessive adhesive metered by the doctor blade, and means for adjusting the axis of the roll and the direction of feed of the fabric toward the roll to control the length of the arc of engagement of the fabric with the roll.

In a preferred embodiment the surface of the adhesive applying roll is cut or engraved to provide a helical groove or recess. The helical groove on the adhesive applying roll serves a dual function of insuring a flow of the adhesive longitudinally along the engraved roll from one end toward the other to prevent undesirable build-up of the adhesive on the roll, and of providing raised surfaces and wells or recesses of adhesive intermediate the raised surfaces which contribute to the application of the adhesive to one of the fabrics in a unique manner.

Another feature of the present invention is the unique manner in which the adhesive is applied to one of the fabrics to produce an effective bond and impart a softer, more natural feel to the fabric. As the fabric travels in contact with the adhesive applying roll, initially an underlay of adhesive is formed on the fabric. If the adhesive applying roll is helically grooved the underlay generally corresponds to the pattern of the grooves, producing a diagonal line pattern. As the fabric moves out of engagement with the adhesive applying roll a stringing effect is produced consisting of a multiplicity of strings extending the entire operative length of the adhesive applying roll, and these strings tend to stretch, ultimately breaking and contracting against the surface, resulting in a base print overlaid with a heterogeneous mass of adhesive tendrils ready for adhesive contact with the surface of the other fabric.

These and other advantages of the present invention will be apparent to one who understands the present invention. For a complete understanding of the present invention reference should be made to the detailed description which follows and to the accompanying drawings in which:

FIG. 2 is an enlarged elevational view partly in cross-section of the adhesive applying portion of the laminating machine;

FIG. 4 is an enlarged perspective view of part of the helically grooved roll of the adhesive applicator shown in FIG. 2.

Figure 1:
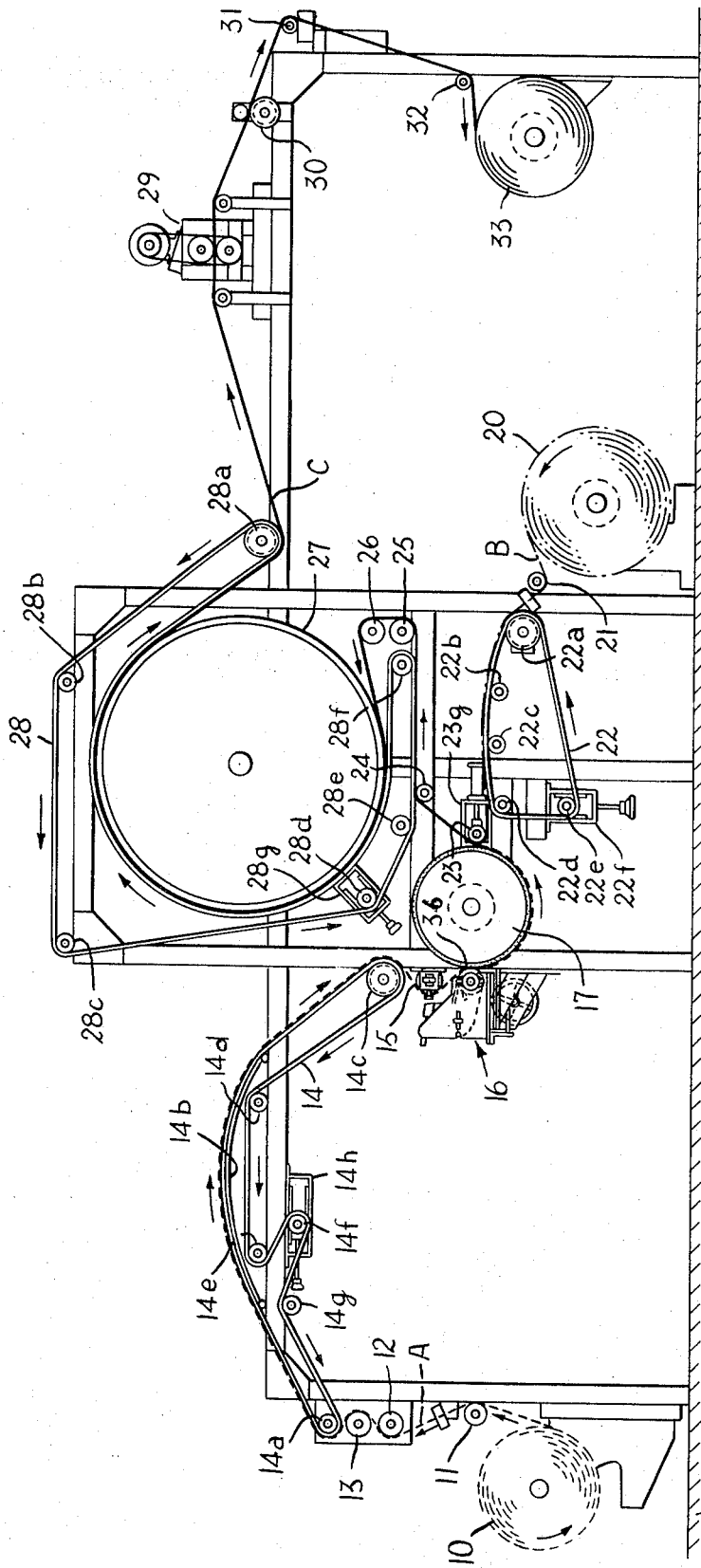
FIG. 1 is a schematic side elevational view of a laminating machine embodying the present invention.

The laminating machine of the present invention is illustrated schematically in preferred form in FIG. 1 of the drawings. In this machine a web of fabric A is unwound from a roll 10, guided by a roll 11, stretched to proper width and alignment by conventional slat expander rolls 12 and 13, carried in a curved path on the upper surface of a moving blanket or carrier 14, fed into engagement with a conventional slat expander roll 15 to insure that the fabric is of proper width after discharge from the blanket 14, and then fed to an adhesive applicator 16 which applies adhesive to the fabric. After the adhesive is applied to the fabric, the fabric passes around the lower periphery of a drum 17 before it is brought into pressure contact with a fabric B to which it is bonded.

The web of fabric B, meanwhile, is unwound from a roll 20, passes from a guide roll 21 onto a blanket or carrier 22, and then passes between the drum 17 and a pressure roll 23 which cooperates to press the fabrics A and B together to form the laminated web C.

The laminated web C is guided by rolls 24, 25 and 26 into engagement with the lower end of a heating drum 27 which dries the solvent and accelerates the drying of the adhesive. The laminated fabric web C is held in engagement with the heating drum for approximately two-thirds of the revolution thereof by a span of a blanket 28. The laminated web C is then guided away from the surface of the heating drum 27 by the blanket 28, passes through a conventional edge trimmer 29 which trims the edges of the laminated web, and then the laminated web is fed by drive rolls 30 and guide rolls 31 and 32 onto a driven rewind roll 33.

The expander rolls 12, 13 spread out the fabric to remove any creases and insure that the fabric is properly stretched and aligned before the fabric passes onto the blanket 14.

The blanket 14 is a continuous fabric carrier which travels in a closed path guided by the roll 14a, the convexly curved guide 14b, driven by roll 14c, and idler rolls 14d, 14e, 14f and 14g. The roll 14f is mountde in displaceable bearings connected to a tensioning device 14h which urges the axis of the roll toward the right, as viewed in FIG. 1, to remove slack from the carrier 14. The coefficient of friction between the fabric carrier and the fabric A keeps the fabric in properly stretched, aligned and oriented condition. A pin or clip carrier can be substituted for the blanket 14.

The expander roll 15 is a conventional roll made up of a plurality of slats which are movable to adjust the width of the fabric, insuring that the fabric is properly presented to the adhesive applicator 16 preparatory to being laminated to the fabric B.

The adhesive applicator is a very important part of the laminating machine of the present invention and its structure and operation will be described in greater detail in connection with FIGS. 2 through 4 of the drawings.

The adhesive applicator includes, inter alia, a trough 35 for an adhesive, a helically grooved roll 36 in communication with the adhesive and applying it to the fabric A, a pre-metering bar 37 to regulate the amount of the adhesive carried by the roll 36, and a flexible doctor blade 38 removing excess adhesive from the roll 36 in advance of the engagement of the fabric with the roll 36 to meter more precisely the adhesive carried by the roll 36 to the fabric.

The trough 35 is mounted between a pair of upright plates of a horizontally movable frame 39. The trough is horizontally adjustable relative to the frame 39 toward and away from the engraved roll 36. Toward this end the trough 35 is supported in horizontal slots 40 of the frame, and the ends of the trough are provided with pivotal screws 41 which pass through holes in lugs 42 of the frame. Each screw carries a threaded nut 43 thereon on each side of the lug 42 to lock the trough in place after it has been properly adjusted.

The trough 35 is formed by a pair of side walls and a downwardly sloped bottom. The side walls of the trough cooperate with recessed portions in the ends of the adhesive roll 36 to form side seals for the trough. The bottom of the trough terminates at a position closely adjacent but spaced apart from the bottom of the adhesive roll. The rotating adhesive roll retains the adhesive within the trough and picks up the adhesive on its surface as it rotates in a clockwise direction as viewed in FIG. 2.

The pre-metering bar 37 extends the operative length of the adhesive roll 36, and its purpose is to provide a rough metering action on the adhesive picked up by the adhesive roll 36 so that the doctor blade 38 can meter the adhesive with precision. The rough metering action of the rigid pre-metering bar breaks down the adhesive so that regardless of the speed of operation of the adhesive roll the quantity of adhesive carried by the surface of the adhesive roll will be approximately the same. The pre-metering bar 37 has an upwardly extending leg 37a and a downwardly extending leg 37b, both of which limit the amount of adhesive carried by the roll 36 and return the excess to the trough. Moreover, the upper surface of the pre-metering bar provides a return flow path for excess adhesive metered by the doctor blade 38, and toward this end its upper surface slopes downwardly and away from the adhesive roll 36. The pre-metering bar is adjustable toward and away from the adhesive applying roll.

The doctor blade 38 is a thin blade made of resilient steel, and it forms an acute angle with the upper portion of the adhesive roll 36 just in advance of a vertical plane passing through the axis of the adhesive roll. The doctor blade 38 is mounted to a holder 45 which is supported at opposite ends by arms 46 which are pivotally supported to opposite side plates of the frame 39. A threaded screw 47 is pivotally connected to each of the upstanding arms 46 and provides a means for pivotally adjusting and locking the doctor blade 38 in operative position. Each screw 47 passes through a hole in a lug 48 pivotally mounted to a side plate of the frame 39, and the screw is locked relative to the lug by nuts 49 threaded on the screw and engaging opposite sides of the lug.

Figure 3:
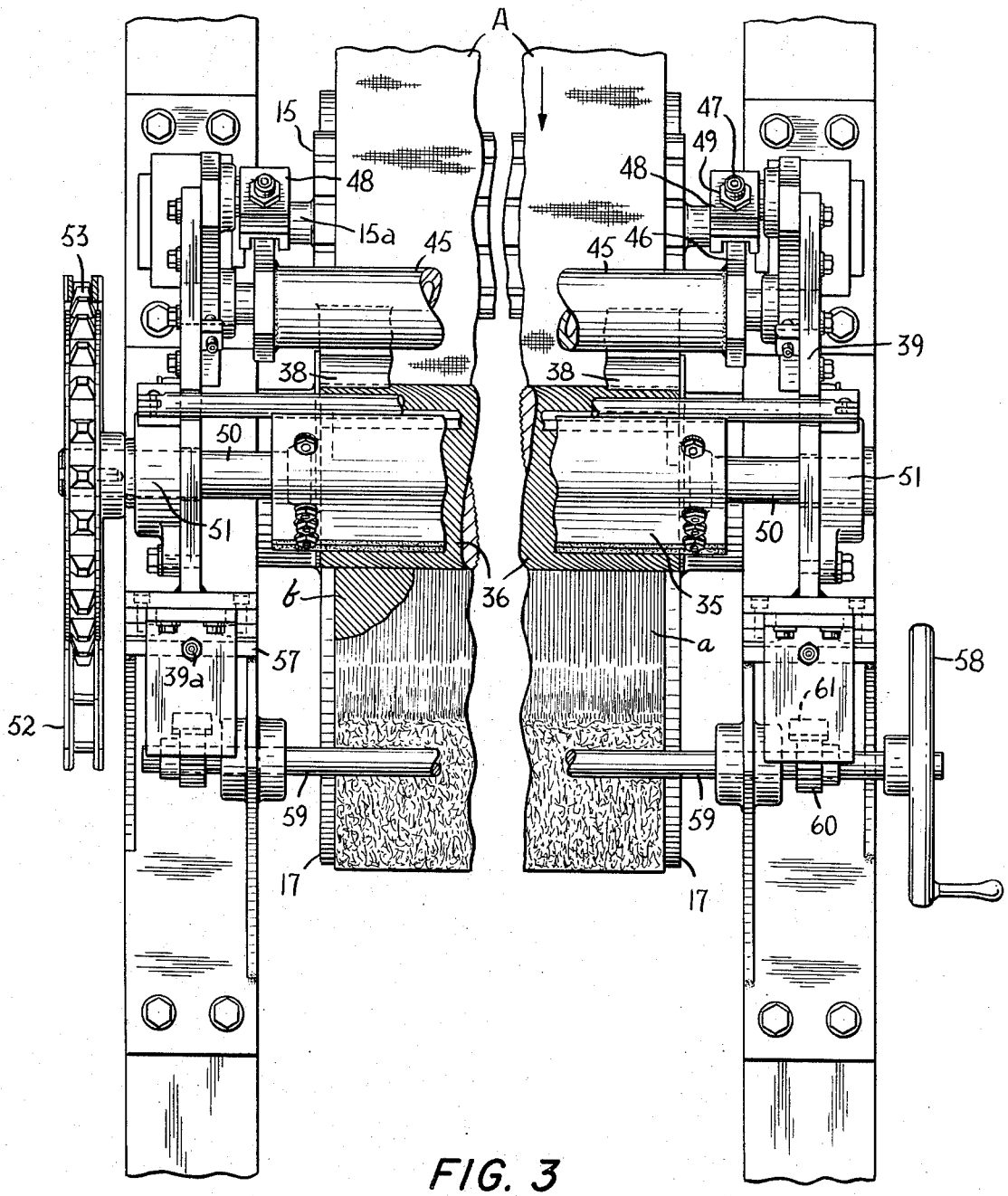
FIG. 3 is an elevational view of the adhesive applying apparatus shown in FIG. 2 as viewed from the left side of FIG. 2.

The adhesive applying roll 36 is supported on a shaft 50 rotatable in bearings 51 mounted to the upstanding side walls of the frame 39 (see FIG. 3). The roll 36 is driven from a variable drive through a drive chain 52 which engages a sprocket 53 carried on one end of the shaft. Ordinarily the adhesive applying roll will be driven at the same speed as the fabric A, but the variable drive permits the speed to be increased or decreased as desired.

The length of fabric in contact with the adhesive applying roll 36 is a factor controlling the amount of adhesive deposited on the surface of the fabric. The length of fabric presented into engagement with the roll 36 can be controlled by the relative positions of the axes of the slat expander roll 15 and the roll 36. Toward this end the axes of both the expander roll 15 and the roll 36 are adjustable horizontally.

The expander roll 15, as shown in FIG. 2, is supported on a shaft 15a which rotates in bearings 55 supported in ways or guides 56 mounted to the main frame of the machine. The bearings are adjustable horizontally under the control of threaded screws 56a.

The horizontal adjustment of the axis of the adhesive applying roll 36 is accomplished by moving bodily the entire adhesive applicating apparatus 16. The entire frame 39 slides on the horizontal rails or guides 57 of the machine frame under the control of a hand wheel 58. The hand wheel 58 is affixed to the end of a transverse shaft 59 supported in the main frame of the machine. The shaft 59 carries a pinion 60 which meshes with a horizontal rack 61 connected to the frame. Thus, the rotation of the hand wheel moves the entire adhesive applicator, including the adhesive applying roll, toward and away from the drum 17. An adjustable stop 39a can be set to facilitate restoring the frame to the proper position.

Moving the expander roll 15 horizontally to the left, as viewed in FIG. 2, and/or moving the adhesive applicator and the roll 36 to the right increases the arc of engagement of the fabric A with a roll 36. Similarly, moving the expander roll 15 to the right and/or the roll 36 to the left will decrease the arc of engagement of the fabric with the roll 36. These adjustments permit a relatively precise control of the amount of face fabric which is presented to the adhesive applying roll.

The adhesive applying roll can be a plain cylindrical roll, but in the form shown in the drawings it is helically grooved. The helical grooving on the roll 36 serves a twofold purpose, first, to provide a flow of the adhesive longitudinally along the roll from one end toward the other to prevent undesirable build-up of adhesive on the roll and, second, to facilitate in the application of adhesive in a preferred pattern on the fabric A. The engraved roll is approximately 5½ in. in diameter having a helical recess 36a extending the entire operative length of the roll. The helical recess is at an angle of approximately 45° with 10 to 30 such recesses per inch, each recess being between .07 and .013 inch deep. In a typical example, the recesses can be spaced 25 per inch, 0.135 in. deep and at an angle of 47° to the axis of the roll.

In the preferred mode of operation of the apparatus, the adhesive tends to form a multiplicity of strings *a* as the fabric leaves engagement with the engraved roll. This effect, schematically illustrated in FIGS. 2 and 3 of the drawings, provides an effective permanent bond between the fabrics A and B while preserving the natural feel and handle of the fabrics. More specifically, as the fabric A comes into engagement with the engraved roll, an initial bond is established between the adhesive and the fabric. A supply of the adhesive is contained within the wells or recesses 36a intermediate the raised surfaces, and these wells or recesses are the sources of supply of the adhesive which continue to supply the adhesive for the stringing effect after the fabric moves away from the engraved roll. The strings tend to stretch, but ultimately they break and contract against the surface of the fabric A.

The pattern of the adhesive as applied to the fabric is a helical base print *b* corresponding to the helical pattern of the engraving on the roll 36 with an upper heterogeneous mass of adhesive tendrils ready for adhesive contact with the surface of the fabric B.

Because the fabric tends to be more taut at the middle and more slack near the edges, the fabric would normally pick up more adhesive at the center than at the edges. To compensate for this, the doctor blade is slightly curved so that it is more closely spaced to the adhesive applying roll at the center and further apart at both ends to insure more uniform application of the adhesive to the fabric.

In addition to possessing all of the characteristics essential for effecting bonding of fabrics without requiring high curing temperatures, the adhesive should possess the necessary elasticity and initial tack characteristics to produce the stringing effect. Non-flammable urethane adhesives, for example, polyesteramide urethane rubber cured in a modified polymeric isocyanate and dissolved in polyesteramide trichlorethylene or butyl acetate, are particularly suitable. The adhesive at the time of application to the fabric A is at room temperature at a viscosity of between 1500 to 30,000 centipoises, preferably about 20,000 centipoises. The adhesive should be used sparingly to insure softness and natural drape.

Coming out of engagement with the engraved roll, the opposite face of the fabric A is almost immediately brought into engagement with the drum 17 which maintains the fabric in the properly stretched and aligned condition while at the same time providing an exposed surface for removal of excess solvent and preliminary drying and vapor removal. The adhesive applying roll is normally adjusted to be in spaced relation to the drum 17 so that the drum does not exert pressure on the fabric while it is in contract with the adhesive applying roll. Although not essential, the surface of the drum can be rubber or a material having a high coefficient of friction to help keep the fabric in properly stretched condition. The drum in the preferred embodiment of the machine is approximately two feet in diameter, and the fabric passes in contact with the lower half of the drum before it is brought into contact with the fabric B.

The fabric B, as explained above, has been carried by the upper convexly curved span of the blanket carrier 22 before it is presented to the nip between the drum 17 and the pressure roller 23. The pressure roll 23 is urged toward the drum 17 by pressure actuating means 23a. The blanket 22 is generally similar to the blanket 14 and travels in a closed path about the driven guide roll 22a, the guide bars 22b and 22c, and the guide rolls 22d and 22e, the roller 22e being urged downwardly by a tensioning device 22f to eliminate slack and keep the blanket under proper tension.

The heating drum 27 is relatively large, say five feet in diameter, and its purpose is to evaporate the remaining solvents left in the adhesive and to provide a backing surface against which the laminated fabric is pressed by the blanket 28. Since it does not cure the adhesive, the surface of the heating drum is maintained at relatively low temperatures, from room temperature to about 95° C.

The laminated web C is held in contact with the heating drum for approximately ⅔ of a revolution by the blanket 28 which is generally similar to the blankes 14 and 22 described above. The blanket 28 is driven by a roll 28a and is guided by a series or rolls 28b, 28c, 28d, 28e and 28f, the guide roll 28d being urged outwardly by a tensioning device 28g to remove slack and maintain the belt under tension.

The components of the machine are driven in precise synchronism from a drive motor, not shown, through speed variators from which, inter alia, the roll 14c for the blanket 14, the adhesive applying roll 36, the drum 17, the roll 22a for the blanket 22, the roll 28a for the blanket 28, the rolls 30 and the rewind roll 33 are driven in precise synchronism throughout the range of speeds at which the apparatus is to be operated. The heating drum 27 could be driven, but in the preferred form of the apparatus it is rotated by the pressure exerted from the moving blanket 28.

If a urethane adhesive is used, curing may take up to 72 hours. Nevertheless, the bond is so effective that the fabric can be handled, cut and processed immediately.

The apparatus and method described above can be utilized to produce various laminated fabrics, for example, a fabric in which a nylon tricot or other lining material B is bonded to a face fabric A. The bonded fabric made according to the present invention has a long life and, depending only on the limitations of the fabric, will withstand boiling, dyeing, water-proofing and repeated washing and dry cleaning without delaminating. The bonded fabric, moreover, is soft to the hand and has a natural drape, characteristics usually not associated with effectively bonded fabrics. Also, since the process requires only low temperatures, there is little or no matting or other change in the face fabric and minimum shrinkage.

The term "fabric" has been used in describing the webs to be bonded by the present invention because the principal application of the invention presently contemplated is in the production of laminated fabrics for wearing apparel. The term "fabric," however, should be construed broadly to include various kinds of materials which it may be desirable to bond together using the principles of the present invention.

The invention has been shown and described in preferred form and by way of example only, and obviously many modifications and variations may be made therein within the spirit of the invention. For example, although the invention has been described in preferred form for the production of laminated fabrics for wearing apparel having soft, natural feel and handle and drape characteristics, the invention can also be used to laminate fabric to foam or in the manufacture of three ply fabrics in which fabrics are bonded to opposite sides of an intermediate layer of foam to impart bulking and eliminate drape. The invention can also be used to produce laminated products where permeability is of importance because the particular structure of the adhesive bond provides effective adhesion without creating a solid, hard, impermeable barrier between the fabrics. The invention, therefore, is not intended to be limited to any specified form or embodiment except insofar as the claims are expressly limited.

I claim:
1. A method of producing a laminated fabric comprising the steps of feeding one fabric against a surface of a rotating adhesive applying roll in communication with a supply of tacky, elastic adhesive at a temperature and viscosity capable of producing a stringing effect when the surface of the fabric is separated from the surface of the adhesive applying roll, forming a multiplicity of strings of adhesive between the adhesive applying roll and the surface of the web as the web moves out of contact with the adhesive applying roll, stretching and breaking the strings as the web moves away from the adhesive applying roll to permit the strings to contract and form a heterogeneous mass of adhesive strings ready for adhesive contact with the surface of another fabric.

2. A method as set forth in claim 1 in which the adhesive is a modified urethane at room temperature at a viscosity of betwen 1500 to 30,000 centipoises.

3. A method as set forth in claim 1 in which the adhesive is a urethane in the presence of solvent and containing a curing agent.

4. A method as set forth in claim 1 including the step of metering the adhesive on the adhesive applying roll using a doctor blade curved to be more closely spaced to the adhesive roll at the middle and further spaced near the ends to compensate for the tendency of the fabric at the middle to pick up more adhesive than near the edges.

5. A method as set forth in claim 1 including the steps of metering the adhesive on the adhesive applying roll by a doctor blade spaced at an acute angle to the surface of the adhesive applying roll and pre-metering the adhesive in advance of the doctor blade by deflecting excess adhesive and returning it to a trough.

References Cited
UNITED STATES PATENTS

| | | | |
|---|---|---|---|
| 3,553,065 | 1/1971 | Stumpf et al. | 161—59 |
| 3,629,027 | 12/1971 | Germain | 165—167 |

ALFRED L. LEAVITT, Primary Examiner

R. A. DAWSON, Assistant Examiner

U.S. Cl. X.R.

117—7, 10, 37 R, 111 B, 111 H; 156—179, 309, 331, 547, 548; 161—90

PO-1050
(5/69)

UNITED STATES PATENT OFFICE
CERTIFICATE OF CORRECTION

Patent No. 3,783,074        Dated January 1, 1974

Inventor(s) John Reginald Normanton

It is certified that error appears in the above-identified patent and that said Letters Patent are hereby corrected as shown below:

Column 3, line 73, after "driven" delete "by"; line 74, correct the spelling of "mounted". Column 5, line 38, after "with" delete "a" and insert --the--; line 57, change "0.135" to --.0135--. Column 6, line 62, delete "blankes" and insert --blankets--.

Signed and sealed this 16th day of April 1974.

(SEAL)
Attest:

EDWARD M.FLETCHER,JR.
Attesting Officer

C. MARSHALL DANN
Commissioner of Patents